(12) United States Patent
Tullos et al.

(10) Patent No.: US 6,905,778 B2
(45) Date of Patent: Jun. 14, 2005

(54) POWDER COATING COMPOSITION, METHOD FOR THE CURING THEREOF, AND ARTICLES DERIVED THEREFROM

(75) Inventors: Tina L. Tullos, Reading, PA (US); Brian T. Myers, Bloomsburg, PA (US); Charles P. Tarnoski, Sinking Spring, PA (US)

(73) Assignee: Rohm and Haas Company, Philadelphia, PA (US)

(*) Notice: Subject to any disclaimer, the term of this patent is extended or adjusted under 35 U.S.C. 154(b) by 62 days.

(21) Appl. No.: 10/267,337

(22) Filed: Oct. 9, 2002

(65) Prior Publication Data

US 2003/0134978 A1 Jul. 17, 2003

Related U.S. Application Data

(60) Provisional application No. 60/328,562, filed on Oct. 11, 2001.

(51) Int. Cl.$^7$ .......................... B32B 27/36; C08L 25/08; C08L 63/00; C08L 67/00
(52) U.S. Cl. ....................... 428/480; 525/111; 525/165; 525/166; 525/418; 525/419; 525/437; 525/438; 525/440; 525/444; 525/445; 525/530
(58) Field of Search ....................... 525/111, 165, 525/166, 418, 419, 437, 438, 440, 444, 445, 530, 533; 428/413, 418, 480

(56) References Cited

U.S. PATENT DOCUMENTS

| | | | |
|---|---|---|---|
| 5,252,670 A | * 10/1993 | Sagawa et al. | 525/124 |
| 5,491,202 A | 2/1996 | Umehara et al. | 525/438 |
| 5,498,783 A | * 3/1996 | Foukes et al. | 525/165 |
| 5,684,067 A | 11/1997 | Muthiah et al. | 525/453 |
| 5,786,419 A | 7/1998 | Meier-Westhues et al. | 524/590 |
| 6,093,774 A | 7/2000 | Dumain | 525/207 |

FOREIGN PATENT DOCUMENTS

| WO | WO 00/56821 | 9/2000 |
|---|---|---|
| WO | WO 01/94463 A1 | 12/2001 |

OTHER PUBLICATIONS

Sartomer Company, Sartomer Products for Powder Coatings, Nov. 2001.*
Gu, J; Synthesis and Application of Matting Agents, abstract, May 1999.*
Tedoldi, Waterborne, High Solids . . . Conference, pp. 4 and 5, Feb. 1995.*
Watson, Peter J. et al, "Gloss Reduction Of Powder Coatings Based On TGIC/Polyester", *presented at the International Waterborne, High Solids and Powder Coatings Symposium,* New Orleans, LA, March 1–3, 2000; 11 pages.
Schmidhauser, John et al; "The Role Of Catalysts in Low–Gloss Epoxy/Polyester Hybrid Powder Coatings", *presented at the International Waterborne, High Solids, and Powder Coatings Symposium,* New Orleans, LA, Feb. 21–23, 2001, pp. 391–402.
Chetcuti, Peter A. et al; "Matting Agents For Powder Coatings", Waterborne & Higher–Solids, and Powder Coatings Symposium, New Orleans, LA, Feb. 9–11, 1994; pp. 685–701.
Ciba Specialty Chemicals, "Matting Agents/Hardeners for Powder Coatings", 1998, pp. 1–10.
Howell, David M. ; *The Technology, Formulation and Application of Powder Coatings* , vol. I, Chapter V, Wiley & Sons, London, 2000, pp. 152–179.
Chetcuti, Peter, A. et al. "Matting Agents for Powder Coatings Expand Gloss Range": Ciba Polymers, Hawthorne, NY, Aug. 1995, pp. 1–4.
Loar, Donald F. et al., "New Reactive Additives For Gloss Reduction In Polyester Powder Coatings", Polymers Paint Colour Journal, Dec. 1995, 2 pages.

* cited by examiner

Primary Examiner—Michael J. Feely
(74) Attorney, Agent, or Firm—Andrew E. C. Merriam

(57) ABSTRACT

A powder coating composition includes an acid-functional polyester resin and a matting agent selected from styrene-maleic anhydride copolymers and acid-functional acrylic resins. The compositions provide low gloss finishes at low curing temperatures, as well as consistent gloss over a wide range of curing temperatures.

20 Claims, No Drawings

POWDER COATING COMPOSITION, METHOD FOR THE CURING THEREOF, AND ARTICLES DERIVED THEREFROM

CROSS REFERENCE TO RELATED PATENT APPLICATIONS

This is a non-provisional application of prior pending U.S. provisional application Ser. No. 60/328,562 filed Oct. 11, 2001.

BACKGROUND

The present invention relates to a powder coating composition capable of providing a matte or low gloss finish on a variety of substrates. The gloss of a cured powder coating is typically described using terms including "matte", "low gloss", and "mid gloss" finishes. In general, gloss is expressed as a percentage of intensity of the reflected light with respect to the intensity of the incident light at a specified angle between the incident light beam and the planar test surface. The terms "matte", "low gloss", and "mid gloss" are defined herein according gloss measured according to ASTM D523 at an angle of 60°. Specifically, a "matte" finish has a 60° gloss less than 20 units; a "low gloss" finish has a 60° gloss of 20 to less than 40 units; and a "mid gloss" finish has a 60° gloss of 40 to less than 60 units.

Gloss reduction in powder coatings may be achieved by producing a fine surface morphology that scatters incident light, resulting in a lower percentage of reflected light. This low percentage of reflected light gives the appearance of matte or reduced gloss. A variety of methods have been developed to provide low gloss powder coatings, including the incorporation of fillers or extenders, the incorporation of incompatible ingredients such as waxes, dry blending of different formulations, and through the incorporation of matting agents.

The incorporation of fillers or extenders has been used to produce gloss in the mid-gloss range, however this technique does not readily provide for coatings to be produced with a smooth matte or low gloss finish. Also, the incorporation of fillers can lead to coatings with reduced physical properties including impact, flexibility, and adhesion due to reduced binder concentrations.

The incorporation of incompatible ingredients such as waxes is also commonly used to produce mid gloss finishes. As with the incorporation of extenders, this technique does not readily provide for coatings with matte or low gloss. Incorporation of waxes often leads to the formation of a surface film as waxes migrate over time, and removal of the surface film can expose a glossy surface underneath.

Dry blending of two powders that have different reactivities or are immiscible has been described in, for example, U.S. Pat. No. 3,842,035 to Klaren. Dry blending requires an additional manufacturing step and the resulting dry blended components can separate over time in a conventional powder coating application and recycle process. The separation of components during the application and recycle process can yield fluctuations in gloss and curing efficiency.

The incorporation of matting agents has also been used to provide a coating with matte or low gloss appearance. The underlying process has been described as one of competing reactions or varying rates of separate reactions. The use of reactive matting agents is described in, for example, European Patent Application Nos. 72,371 A1 to Holderegger et al., and 44,030 A1 to Gude et al.; European Patent Nos. 165,207 B1 and 366,608 B1 to Lauterbach; U.S. Pat. No. 5,684,067 to Muthiah et al., U.S. Pat. No. 5,786,419 to Meier-Westhues et al.; D. H. Howell, "The Technology, Formulation and Application of Powder Coatings", J. D. Sanders, Ed., John Wiley and Sons in association with SITA Technology Limited: London, England 2000. Vol. 1, pages 152–178; C. Grob and C. Rickert (2000) *Water-Borne, Higher-Solids, and Powder Coatings Symposium*, New Orleans, 1–3 Mar. 2000, pp 337–349; P. A. Chetcuti, B. Dreher, and P. Gottis, *Mod Paint Coatings* (1995), volume 85, no. 7, pages 28–32; J. J. Salitros and R. Patarcity, *Proc. Water-Borne, Higher-Solids, Powder Coat. Symp.* (1992), 19th, pages 517–526; and J. Schmidhauser and J. Havard, *Proc. Int. Waterborne, High-Solids, Powder Coat. Symp.* (2001), 28th, 391–404.

Techniques to lower gloss in acid functional polyester systems include the incorporation of zinc complexes as described, for example, in U.S. Pat. No. 5,684,067 to Muthiah et al., European Patent Nos. 165,207 B1 and 366,608 B1 to Lauterbach; and D. F. Loar and P. Verle, *Eur. Polym. Paint Colour. J.* (1994), vol. 184, issue no. 4359, pages 504–506. This route may yield inconsistent gloss when cure is carried out over a wide temperature range, and it may lead to a blooming at the coatings surface when cure is carried out at temperatures of less than 300° F.

Another technique to achieve a matte or low gloss in an acid functional polyester is to react it with a glycidyl functional acrylic polymer. This is described in, for example, D. H. Howell, cited above; T. Agawa, H. Suzuki, and H. Takeda, *Poly. Mater. Sci. Eng.* 1992, 204(2), pp 170–172; and U.S. Pat. No. 5,436,311 to Dumain et al. The use of glycidyl methacrylate (GMA) acrylic resins in powder coating formulations creates some disadvantages. The presence of small amounts of GMA acrylic resins may cause surface defects in powder coatings that use other types of resins and that do not contain GMA acrylic resins. As a result facilities that spray powder coatings containing GMA acrylics must isolate this powder coating spray process from spray processes that do not use GMA acrylic resins.

Examples of acid functional reactive matting agents used in epoxy systems and polyester/epoxy hybrid systems include styrene maleic anhydride copolymers or esterified styrene maleic anhydride copolymers as described in the Salitros et al. and Schmidhauser et al. references cited above. The styrene-maleic anhydride copolymers are described as only functioning as matting agents at cure temperatures of at least 400° F. in polyester/epoxy hybrid systems.

There remains a need for a coating composition that conveniently provides consistent low gloss or matte gloss over a broad temperature range.

BRIEF SUMMARY

The above-described and other drawbacks and disadvantages of the prior art are alleviated by a curable powder coating composition, comprising: an acid-functional polyester thermoset resin; and a matting agent selected from styrene-maleic anhydride copolymers and acid-functional acrylic resins.

Other embodiments, including a method of forming a cured powder coating, are described in detail below.

DETAILED DESCRIPTION OF THE PREFERRED EMBODIMENTS

One embodiment is a curable powder coating composition, comprising: an acid-functional polyester thermoset resin; and a matting agent selected from styrene-maleic anhydride copolymers and acid-functional acrylic resins.

Acid-functional polyesters resins useful in the present invention are linear or branched, being formed of polyols and poly-functional carboxylic acids (or monomers having both hydroxyl and carboxylic acid functionality). Carboxylic functionality is provided in excess over hydroxyl functionality by selecting carboxyl-terminated polyester chains. The polyesters are relatively short chains having a number average molecular weight of 2,000 to 7,000 atomic mass units (AMU). The polyesters may have an acid number of 15 to 100 mg KOH/g. Within this range, an acid number of at least 25 may be preferred. Also within this range, an acid number up to 90 may be preferred. The polyester resins have an acid functionality of 2 to 3.5. Within this range, an acid functionality up to 2.5 may be preferred. The glass transition temperatures of suitable polyester resins may be 40° C. to 80° C.

Examples of suitable polyols for forming the polyester include 1,2-ethanediol, 1,3-propanediol, 1,4-butanediol, diethylene glycol, 1,6-hexanediol, neopentyl glycol, 1,10-decanediol, 1,4-cyclohexanedimethanol, trimethylolpropane, 2-methyl-1,3-propanediol, hydrogenated bisphenol A (or 2,2-(dicyclohexanol)propane), 2,2,4-trimethyl-1,3-pentanediol, 3-hydroxy-2,2-dimethylpropyl 3-hydroxy-2,2-dimethylpropanoate (CA. Reg. No.=115-20-4), 1,12-dodecanediol, 2-methyl-2-hydroxymethyl-1,3-propanediol, 2-ethyl-2-hydroxymethyl-1,3-propanediol, and the like, and combinations comprising at least one of the foregoing polyols. Suitable polycarboxylic acids which may be used for forming the polyester include succinic acid, adipic acid, azelaic acid, sebacic acid, 1,12-dodecanedioic acid, terephthalic acid, isophthalic acid, trimesic acid, tetrahydrophthalic acid, hexahydrophthalic acid, 1,4-cyclohexanedicarboxylic acid, trimellitic acid, naphthalene dicarboxylic acid, and the like, and combinations comprising at least one of the foregoing polycarboxylic acids. To obtain carboxyl-functional polyesters of desired molecular weight, the monomer mixture used to form the polyester has an appropriate excess of carboxyl functionality to hydroxyl functionality.

Suitable acid-functional polyesters are commercially available and include, for example, ALFTALAT® AN 783 from Vianova Resins, having an acid number of 34, a glass transition temperature of 52° C., and a melt viscosities of 45–55 poise at 200° C.; and RUCOTE® 911 from Ruco Polymers, having an acid number of 35, a glass transition temperature >55° C., and a melt viscosity of 15 poise at 200° C.

The powder coating composition further comprises a matting agent selected from styrene-maleic anhydride copolymers and acid-functional acrylic resins.

The matting agent may preferably have a glass transition temperature ($T_g$) less than 110° C. A $T_g$ of 40° C. to 110° C. is preferred. Within this range, the $T_g$ may preferably be at least 45° C. Also within this range, the $T_g$ may preferably be up to 100° C., more preferably up to 90° C., yet more preferably up to 80° C.

The acid number of the matting agent is preferably 100 to 320 mg KOH/g. Within this range, the acid number may preferably be at least 110 mg KOH/g. Also within this range, the acid number may preferably be up to 210 mg KOH/g.

The styrene-maleic anhydride resin may preferably have a mole ratio of styrene:maleic anhydride of 1:1 to 4:1. Suitable styrene-maleic anhydride resins include unmodified styrene-maleic anhydride resins, partially or fully monoesterified styrene-maleic anhydride resins (in which one of the two carbonyls on each maleic anhydride is present as a partially or fully esterified carboxylic acid and the other is present as a free carboxylic acid), partially or fully diesterified styrene-maleic anhydride resins (in which both of the carbonyls on each maleic anhydride are present as partially or fully esterified carboxylic acids), and mixtures comprising at least one of the foregoing resins. Preferred ester groups may be formed by reaction of an unmodified styrene-maleic anhydride with an alcohol having 4 to 24 carbon atoms.

Suitable styrene-maleic anhydride resins include, for example, the partially monoesterified styrene-maleic anhydride copolymer obtained as SMA® 1440F from Sartomer, having a styrene:maleic anhydride mole ratio of 1:1, a glass transition temperature of 55° C., an acid number of 165–205, 55–75% monoesterification, and melt viscosities of 300 poise at 160° C., 110 poise at 180° C., and 70 poise at 200° C.; the partially monoesterified styrene-maleic anhydride copolymer obtained as SMA® X.11825 from Sartomer, having a styrene:maleic anhydride mole ratio of 1:1, a glass transition temperature of 110° C., an acid number of 315, 25% monoesterification, a weight average molecular weight of 3,200 AMU, and a number average molecular weight of 6,800 AMU; and the partially esterified styrene-maleic anhydride copolymer obtained as SMA® X.11850 from Sartomer, having a styrene:maleic anhydride mole ratio of 1:1, a glass transition temperature of 90° C., an acid number of 215, 50% monoesterification; a number average molecular weight of 3,800 AMU, and a weight average molecular weight of 8,300 AMU. Preferred styrene-maleic anhydride resins include the partially monoesterified styrene-maleic anhydride copolymer obtained as SMA® 1440F from Sartomer.

The matting agent may be an acid-functional acrylic resin. Suitable acid-functional acrylic resins include copolymers of acrylic acid and other copolymerizable monomers, including alkyl (meth)acrylates such as methyl methacrylate, and alkenyl aromatic monomers such as styrene.

Suitable acid-functional acrylic resins are commercially available as, for example, the acrylic acid copolymer available from Estron Chemical as G-151, having an acid number of 140 and a glass transition temperature of 60° C.

The composition may comprise the matting agent in an amount of 3 to 35 percent by weight, based on the total weight of the composition. Within this range, the matting agent amount may preferably be at least 5 percent by weight. Also within this range, the matting agent amount may preferably be up to 30 percent by weight.

The composition may, optionally, further comprise an epoxy resin. Suitable epoxy resins include those containing aliphatic or aromatic backbones with oxirane functionality. Examples include the diglycidyl ether condensation polymers resulting from the reaction of epichlorohydrin with a bisphenol in the presence of an alkaline catalyst. Bisphenol A is most commonly used but the bisphenols B, F, G and H are also suitable. By controlling the operating conditions and varying the ratio of the reactants, products of various equivalent weights can be made. It may be preferred that the epoxide equivalent weight (EEW) may be 600 to 2000 atomic mass units (AMU) and the hydroxyl equivalent weight may be 300 to 400 AMU. Epoxy resins are available from a wide variety of commercial sources. Useful epoxy resins include the bisphenol A epoxy resins available from Vantico as ARALDITE® GT-7004, GT-7013 (type 3), GT-7014, GT-7072 (type 2), GT-7074, GT-7097, and the like. Bisphenol A epoxy resins further include those available from Shell Chemical Company as EPON® 1007F, EPON® 1009F, EPON® 1004, and the like. Suitable epoxy resins further include the epoxy phenol novolac resins available from Vantico as ARALDITE® GT-7220, and the epoxy cresol novolac resins available from Vantico as ARALDITE® GT-6259.

When present, the epoxy resins may be used in an amount of 10 to 90 weight percent of the total of the polyester resin and the epoxy resin. Within this range, an epoxy resin amount of at least 30 weight percent may be preferred. Also within this range, an epoxy resin amount of up to 70 weight percent may be preferred.

The composition may, optionally, comprise a curing agent. Although the resins are self curing, the addition of a curing agent may be useful to raise the curing rate to a commercially desirable value.

Suitable curing agents include heterocyclic polyepoxides having two or more epoxides, such as triglycidylisocyanurate (TGIC); polyepoxides of aromatic polyols such as the diglycidyl ether of bisphenol A; cycloaliphatic polyepoxides; glycidyl esters of aromatic or aliphatic polyacids, such as the diglycidyl ester of hexahydrophthalic acid; low equivalent weight epoxy-functional acrylic resins; polyepoxides of aliphatic polyols such as the diglycidyl ether of 1,4-butanediol; and polyepoxides of amino-alcohols, such as the tri-glycidyl ether-amine of 4-amino phenol. Other aromatic polyols which may be used to prepare glycidyl ethers include such species as bisphenol F, and tetrabromobisphenol A, and the like. Polyepoxides from this category also include low molecular weight polymers derived from the above-named aromatic diols and their diglycidyl ethers. Cycloaliphatic polyepoxides include such compounds as 3',4'-epoxycyclohexylmethyl 3,4-epoxycyclohexylcarboxylate, dicyclopentadiene dioxide, and the like.

Suitable curing agents further include amide compounds having two or more hydroxyl functional groups, such as the beta-hydroxyalkyl amides sold under the tradenames PRIMID® XL 552 (N,N,N',N'-tetrakis(2-hydroxyethyl)adipamide) and PRIMID® QM 1260 (N,N,N',N'-tetrakis(2-hydroxypropyl)adipamide) by EMS Chemie.

Suitable curing agents further include imidazoles such as 2-methyl imidazole, 2-isopropyl imidazole, 2-phenyl imidazole; adducts of an imidazole or substituted imidazole and an epoxy resin; trihydrocarbyl phosphorous compounds such as triphenylphosphine and triethyl phosphine; tetrahydrocarbyl phosphorous salts such as methyl triphenyl phosphonium bromide (MTPB), tetra n-butyl phosphonium bromide (TPB), ethyl triphenyl phosphonium bromide, and the like; tetrahydrocarbyl ammonium halide salts such as benzyl trimethyl ammonium chloride; and mixtures comprising at least one of the foregoing curing agents.

Suitable curing agents include epoxy adducts of an imidazole having the formula

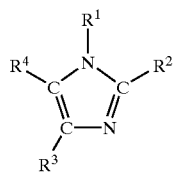

wherein $R^1$–$R^4$ are each independently hydrogen, $C_1$–$C_{12}$ alkyl, $C_6$–$C_{18}$ aryl, $C_7$–$C_{18}$ arylalkyl, $C_7$–$C_{18}$ alkylaryl, or the like. Examples of suitable imidazoles include imidazole, 2-methyl imidazole, and 2-phenyl imidazole.

The imidazoles themselves are commercially available as, for example, 2-phenyl imidazole from the SKW Chemical Co. Suitable adducts of such imidazoles with a bisphenol A epoxy resin are available commercially as, for example, EPON® P-101 from Shell Chemical Company, and ARALDITE® HT-3261 from Ciba-Geigy. Mixtures of imidazole adducts may be used. Although applicants are not bound to any theory, it is believed that the imidazole adducts catalyze curing of epoxy resins by an opening of the epoxy ring that results in the epoxy oxygen bonding to the C=N bond of the imidazole ring. The adducted imidazole acts as a catalyst, moving from one epoxy group to another as it facilitates epoxy ring opening and cure reactions. The imidazoles are, in themselves, the operative catalysts but they tend to be insoluble in epoxy resins. Thus, the purpose for adducting them to an epoxy resin is to make them compatible with the epoxy system.

Suitable curing agents further include organoborate salts of the formulae

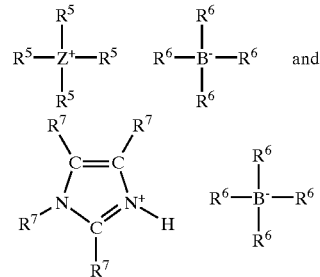

wherein Z is P, As, or N; each $R^5$ is independently $C_1$–$C_{12}$ alkyl, $C_2$–$C_{12}$ alkenyl, $C_6$–$C_{18}$ aryl, $C_7$–$C_{18}$ arylalkyl, $C_7$–$C_{18}$ alkylaryl, or the like; each $R^6$ is independently $C_1$–$C_{12}$ alkyl, $C_6$–$C_{18}$ aryl, $C_7$–$C_{18}$ arylalkyl, $C_7$–$C_{18}$ alkylaryl, Br, Cl, I, F, or the like; and each $R^7$ is independently hydrogen, $C_1$–$C_{12}$ alkyl, $C_2$–$C_{12}$ alkenyl, $C_6$–$C_{18}$ aryl, $C_7$–$C_{18}$ arylalkyl, $C_7$–$C_{18}$ alkylaryl, $C_2$–$C_{12}$ acyl, aldehyde, carboxylate, cyano, nitro, or the like. Specific examples of these compounds and methods for their preparation are provided in U.S. Pat. No. 3,859,379 to Kitamura et al.

When present, the curing agent may be used in an amount of 0.1 to 20 parts by weight per 100 parts by weight of the acid functional polyester resin. When additional thermoset resins are present, the curing agent may be used in an amount of 0.1 to 20 parts by weight per 100 parts by weight of the total thermoset resin (e.g., the total of the polyester resin and any epoxy resin present). Selection of a curing agent amount, which may be readily determined by those of ordinary skill in the art, will depend on the identity of the curing agent, the identity of the resin, and the desired properties of the cured coating, among other factors.

The composition may, optionally, comprise one or more additives known in the art. Such additives include, for example, flow control agents, dry flow agents, antioxidants, pigments, optical brighteners, extenders, combinations comprising at least one of the foregoing additives, and the like.

Examples of the flow control agents include the MODAFLOW® poly(alkyl acrylate) products available from Monsanto and the SURFYNOL® acetylenic diols (e.g., P200), available from Air Products, which contain hydroxyl, carboxyl or other functional groups. The functionalized flow additives also aid intercoat adhesion in the event that touchup or repair of the powder coating is necessary. The flow additives may be used singly or in combination.

Flow control agents, sometimes called leveling agents, are useful to promote the formation of a continuous coating. Suitable flow control agents include polyacrylic esters, non-ionic fluorinated alkyl ester surfactants, non-ionic alkylarylpolyether alcohols, silicones, and the like, and combinations comprising at least one of the foregoing flow control agents. Flow control agents are generally liquids that have been converted to powder form by absorption onto silica-type materials. A preferred flow control agent is sold under the tradename RESIFLOW® P-67 acrylic resin by Estron Chemical, Inc., which is a 2-propenoic acid, ethyl ester polymer. Another preferred flow control agent is sold under the tradename Benzoin by DSM, Inc., which is a 2-hydroxy-1,2-diphenylethanone crystalline solid that is believed to keep the molten coating open for a suitable time to allow outgassing to occur prior to the formation of the hard set film. When present, the flow control agent may be used at an amount of 1 part by weight to 5 parts by weight, per 100 parts by weight of polyester resin.

Suitable dry flow agents include fumed silica and fumed alumina. An example of fumed silica is sold under the tradename CAB-O-SIL® by Cabot Corporation. An example of fumed alumina is sold under the tradename Aluminum Oxide C by Degussa Corporation. When present, the dry flow agent may be used in an amount of 0.05 weight percent to 0.5 weight percent, based on the total weight of the composition.

Pigments may be used to adjust color and opacity. Suitable pigments include, for example, titanium dioxide, carbon black, phthalocyanine blue, phthalocyanine green, quinacridone red, perylene red, isoindolone yellow, dioxazine violet, scarlet 3B lake, red 188 azo red, azo pigment yellow 83, iron oxide pigments, and the like. When present, the pigment may be used in an amount of up to 100 parts by weight per 100 parts by weight of polyester resin.

The thermosetting powder coating compositions may contain as another component, an extender or filler. Suitable extenders include calcium carbonate, barium sulfate, dolomite, wollastonite, talc, mica, and the like. When present, the extender may be used in an amount up to 120 parts by weight per 100 parts by weight polyester resin. Within this range, an extender amount of at least 10 parts by weight is preferred. Also within this range, an extender amount of up to 80 parts by weight is preferred.

Antioxidants prevent discoloration of the coatings. Suitable antioxidants include, for example, sodium hypophosphite, tris-(2,4-di-t-butyl phenyl) phosphite (available as IRGAFOS® 168 from Ciba-Geigy), calcium bis([monoethyl(3,5-di-t-butyl-4-hydroxybenzyl) phosphonate] (available as IRGANOX® 1425 from Ciba-Geigy), and the like. Mixtures of antioxidants may be used. The sodium hypophosphite may also act as a buffer against the action of trace amounts of chlorine released by epichlorohydrin residues in the epoxy resins. When present, antioxidants may be used in an amount of 0.5 to 2.0 parts by weight per 100 parts by weight of polyester resin.

Suitable optical brighteners include, for example, 2,2'-(2,5-thiophenediyl)bis[5-t-butylbenzoxazole, available as UVITEX® OB from Ciba-Geigy. When present, optical brighteners may be used at 0.1 to 0.5 parts by weight per 100 parts by weight of polyester resin.

There is no particular limitation on the method used for forming the curable composition. Preferred methods include melt mixing, in which the dry ingredients are weighed into a batch mixer and are mixed with a medium intensity horizontal plowmixer or a lesser intensity tumble mixer. Mixing times range from 1 to 3 minutes for the high intensity mixers to 30–60 minutes for the tumble mixers. The premix may then be further mixed and compounded as the resin is melted in either a single screw or a twin screw extruder for 0.5 to 1 minute. The extrudate may be cooled quickly and broken into small chips suitable for grinding.

The curable powder coating composition may be used in coating glass, ceramics, and graphite-filled composites, as well as metallic substrates such as steel and aluminum. The composition is particularly useful in the coating of heat sensitive substrates such as plastics, paper, cardboard and woods. Wood is herein defined as any lignocellulosic material, whether it comes from trees or other plants, and whether it be in its natural forms, shaped in a saw mill, separated into sheets and made into plywood, or chipped and made into particleboard, or whether its fibers have been separated, felted, or compressed. It is exemplified by lumber, panels, molding, siding, oriented strand board, hardboard, medium density fiberboard (MDF), and the like. Fiberboard having a pattern such as a simulated wood grain printed on its surface, rather than on a paper laminated to that surface, and a powder coating of this invention over said pattern has the appearance of natural wood. MDF is a particularly valuable coating substrate. Substrates may preferably have a moisture content of 3 to 10% by weight. The substrate may be treated to enhance its electrical conductivity. Thus, a porous substrate such as particleboard, pre-coated with a conductive liquid coating composition and cured, may also serve as a substrate for the coating powder. For example, a smooth 2–3 mil thick powder coating is achieved on a 0.5 to 1 mil thick UV-cured or thermally cured pre-coat. The curable powder coating composition is also useful for coating plastic parts for the interior and exterior of automobiles. Due to the highly reactive nature of the curable powder coating composition, storage at or below 70° F. may be desirable to maintain consistent coating characteristics over extended periods of time. Consistent coating characteristics may be maintained over a 3 month period when the powder is stored at 50° F.

The coating powder may be applied to substrates by conventional means, including electrostatic fluidized beds, electrostatic spray guns, triboelectric guns, and the like. The coating thickness may be 1.0 mil to 25 mils. Within this range, a coating thickness of at least 1.5 mils is preferred. Also within this range, a coating thickness of up to 4 mills is preferred.

The curing temperature may be 200° F. to 500° F. Within this range, the cure temperature may preferably be at least 220° F., more preferably at least 250° F. Also within this range, the cure temperature may preferably be up to 450° F., more preferably up to 400° F. One advantage of the curable compositions is their ability to produce matte and low gloss finishes at low curing temperatures, such as curing temperatures as low as 350° F., more preferably as low as 300° F., even more preferably as low as 250° F. Another advantage of the curable compositions is their ability to produce matte and low gloss finishes over a wide range of curing temperatures. For example, such finishes may be produced over the entire temperature range of 300° to 400° F., more preferably 250° F. to 400° F.

One embodiment is a curable powder coating composition, comprising: 100 parts by weight of an acid-functional polyester thermosetting resin; 5 to 35 weight percent, based on the total weight of the composition, of a partially monoesterified styrene-maleic anhydride resin having a glass transition temperature less than 90° C.; and 1 to 30 parts by weight of a curing agent selected from heterocyclic polyepoxides, polyepoxides of aromatic polyols, beta-hydroxyalkyl amides, and mixtures thereof.

Another embodiment is a curable powder coating composition, comprising: 1 to 99 parts by weight of an acid-functional polyester thermosetting resin; 99 to 1 parts by weight of an epoxy thermosetting resin, wherein the sum of the polyester thermosetting resin and the epoxy thermosetting resin is 100 parts by weight; 5 to 35 weight percent, based on the total weight of the composition, of a partially monoesterified styrene-maleic anhydride resin having a glass transition temperature less than 90° C.; and 1 to 30 parts by weight of a curing agent selected from heterocyclic polyepoxides, polyepoxides of aromatic polyols, beta-hydroxyalkyl amides, and mixtures thereof.

Another embodiment is a cured powder coating composition, comprising the reaction product of: an acid-functional polyester thermoset resin; and a matting agent selected from styrene-maleic anhydride copolymers and acid-functional acrylic resins. Another embodiment is an article comprising the above cured powder coating composition.

Another embodiment is a method of forming a cured powder coating, comprising: heating a curable powder coating composition at a temperature up to 350° F. and a time up to 60 minutes to form a cured powder coating exhibiting a 60° gloss value less than 30 units measured according to ASTM D523; wherein the curable powder composition comprises an add-functional polyester thermoset resin, and a matting agent selected from styrene-maleic anhydride copolymers and acid-functional acrylic resins.

Another embodiment is a method of forming a cured powder coating, comprising: heating a curable powder coating composition at a temperature of 250° F. to 400° F. and a time of 1 minute to 60 minutes to form a cured powder coating exhibiting a 60° gloss value less than 30 units measured according to ASTM D523; wherein the curable powder composition comprises an acid-functional polyester thermoset resin, and a matting agent selected from styrene-maleic anhydride copolymers and acid-functional acrylic resins; and wherein the specified gloss is obtained throughout the curing temperature range of 250° F. to 400° F.

The invention is further illustrated by the following non-limiting examples.

General Experimental

All components were obtained commercially. An acid functional polyester was obtained as ALFTALAT AN 783 from Vianova Resins with an acid number of 34, a glass transition temperature of 52° C., and a melt viscosity of 45–55 poise at 200° C. An acid functional polyester was obtained as RUCOTE® 911 from Ruco Polymers with an acid number of 35, a glass transition temperature of >55° C., and a melt viscosity of 15 poise at 200° C. A glycidyl containing acrylic resin was obtained as CRYLCOAT® 700 from UCB Chemicals with an epoxy equivalent weight of 730–750, and a melt viscosity of 175 poise at 200° C. Beta-hydroxy alkyl amides were obtained as PRIMID® XL 552 and PRIMID® QM 1260 from EMS Chemie with an OH equivalent weight of 85 and 100 respectively, both have a melting point of 120–125° C. A diglycidyl ether of bisphenol A epoxy resin with a weight per epoxide between 650 and 725 grams was obtained as ARALDITE® GT-7013 is from Vantico. A diglycidyl ether of bisphenol A epoxy resin with a weight per epoxide between 550 and 700 grams was obtained as ARALDITE® GT-7072 from Vantico. An acrylic flow modifier absorbed onto silica gel was obtained as RESIFLOW® P-67 from Estron Chemical. Inc. Barium sulfate was obtained as BARITE 1075 from Polar Minerals. Titanium dioxide was obtained as TIOXIDE TR 93 from Tioxide Americas. Carbon black pigments were obtained as RAVEN BLACK 22, RAVEN BLACK 500, RAVEN BLACK 1250 BEADS, RAVEN 5000 ULTRA II BEADS and RAVEN BLACK 1255 from Columbian Chemicals, Inc. Calcium carbonate was obtained as QUINCY WHITE® 6 from Omya. Nepheline syenite was obtained as MINEX 7 from Mozel, Inc. Benzyl trimethyl ammonium chloride was obtained from RSA Corporation. Benzyl trimethyl ammonium chloride was mixed in equal weight ratio in a high speed mixer with MINEX 7 to form MB 71000. A ethylene acrylic acid copolymer was obtained as ENVELON® 5000 from Dow Chemical. ENVELON® 5000 was ground into a powder which passed through a (−) 40 mesh (US Standard) screen to form MB Envelon®. A modified polyolefin wax was obtained as DT 3329 from Ciba-Geigy with a melting point of 105–117° C.

A fumed silica was obtained as CAB-O-SIL® M5 from Cabot Corporation. A fumed alumina was obtained as Aluminum Oxide C from Degussa. A substituted dicyandiamide was obtained as DYHARD® 100M from SKW Chemicals, Inc. 2-Methyl imidazole was obtained as DYHARD® MI from SKW Chemicals, Inc. 2-Hydroxy-2-phenylacetophenone was obtained as Benzoin M is from DSM.

A styrene-maleic anhydride copolymer was obtained as SMA® 1440F from Sartomer; this material has a styrene:maleic anhydride mole ratio of 1:1, a glass transition temperature of 55° C., an acid number of 165–205, 55–75% monoesterification, and melt viscosities of 300 poise at 160° C., 110 poise at 180° C., and 70 poise at 200° C. ester of a styrene-maleic anhydride copolymer was obtained as SMA® 3840 from Sartomer; this material has a styrene:maleic anhydride mole ratio of 3:1, a glass transition temperature of 66° C., an acid number of 105, and melt viscosities of 2,150 poise at 160° C., 50 poise at 180° C., and 30 poise at 200° C. An ester of a styrene-maleic anhydride copolymer was obtained as SMA® X.10840 from Sartomer with a number average molecular weight of 2,640 g/mol, a weight average molecular weight of 5,600 g/mol, a glass transition temperature of 85° C., an acid number of 240, 65% monoesterification, and viscosities of 1,700 poise at 160° C., 420 poise at 180° C., and 140 poise at 200° C. A ester of a styrene-maleic anhydride copolymer was obtained as SMA® X.11825 from Sartomer with a glass transition temperature of 110° C., an acid number of 315, 25% monoesterification, a weight average molecular weight of 3,200 g/mol, and a number average molecular weight of 6,800 g/mol. A ester of a styrene-maleic anhydride copolymer was obtained as SMA® X.11850 from Sartomer with a glass transition temperature of 90° C., an acid number of 215, 50% monoesterification; a number average molecular weight of 3,800 g/mol, and a weight average molecular weight of 8,300 g/mol. An ester of a styrene-maleic anhydride copolymer was obtained as SMA® 31890 with a glass transition temperature of 45° C., an acid number of 110, 85% monoesterification, a number average molecular weight of 6,200 g/mol, a weight average molecular weight of 15,000 g/mol, and viscosities of 150 poise at 140° C., 40 poise at 160° C., and 20 poise at 180° C. An acrylic acid copolymer was obtained from Estron Chemical as G-151 with an acid number of 140 and a glass transition temperature of 60° C.

An acid functional polyester resin was manufactured internally as described in U.S. Pat. No. 5,880,223 as Morkote® 500P with an acid number of 35 and a glass transition of 60° C. and melt viscosities of 20–35 poise at 200° C.

Unless otherwise noted, all component amounts are expressed as parts by weight.

Coating powders were prepared by initially blending by hand for 1 minute all components except the fumed alumina or fumed silica. The blend was then melt mixed in a 30 mm twin screw Baker Perkins extruder or a 24 mm Prism extruder having a front zone maintained at 180–200° F. and an unheated rear zone. The extrudate was then chipped and ground with 0.1–0.2% by weight of fumed alumina or fumed silica to a fine powder that passed through a 140 mesh screen (U.S. Standard).

Pre-cleaned steel test panels (from "Q" Panel Co.) measuring 3"×6"×0.032" (7.6×15.2×0.08 cm) were coated using standard electrostatic spray techniques and baked in an oven at the temperatures and times specified to give a coating having thickness of 1.5 to 2.5 mils.

Forward impact resistance was measured according to ASTM G 14 using a ⅝" indenter.

Methyl ethyl ketone resistance (MEK resistance), a rating of solvent resistance and an indication of crosslink density, was measured as follows. A cotton swab was soaked in MEK and rubbed with pressure in a back and forth stroking motion 50 times. A relative rating was given on a scale of 1–5 with a rating of 5 defined as the most solvent resistant and a rating of 1 justified when the coating can be completely removed during the process to expose bare substrate. More specifically, a rating of 5 corresponds to no rub off, 4 to slight rub off, 3 to moderate rub off, 2 to severe rub off, and 1 to complete rub through to substrate.

Gloss was measured at 60° according to ASTM D523.

COMPARATIVE EXAMPLE 1

The composition of Comparative Example 1 is given in Table 1. Test results, presented in Table 5, show that a matte finish was obtained at curing temperatures of 275–400° F. However, below 300° F. the coating system did not adequately cure, even when curing times were extended to 60 minutes as can be seen from the MEK rating of 2. Impact properties remained low at 40 in-lbs throughout the range of cure temperatures. Similar coatings are described in Howell et. al., Hoebeke, J. M. et al., and Agawa et. al. While this techniques does give consistent low gloss over a broad temperature range, the use of GMA acrylic resins in powder coating formulations creates some disadvantages. The low surface energy of GMA acrylic resins causes these types of resins to create surface defects in powder coatings that use other types of resins and that do not contain GMA acrylic resins. As a result facilities that spray powder coatings containing GMA acrylics must isolate this powder coating spray process from spray processes that do not use GMA acrylic resins. It is therefore desirable to provide a coating that provides consistent low gloss or matte gloss over a broad temperature range that does not use GMA acrylic resins and gives good impact properties.

TABLE 1

| Component | Comparative Example 1 |
|---|---|
| Alftalat ® AN 783 | 66.5 |
| Crylcoat ® 700 | 32.5 |
| Primid ® XL-552 | 0.5 |
| Resiflow ® P-67 | 1.0 |
| Barite 1075 | 10 |
| Raven 1250 Beads | 2 |
| Aluminum Oxide C | 0.2 |

EXAMPLES 1–8, COMPARATIVE EXAMPLES 2–8

The compositions of Examples 1–8 and Comparative Examples 2–8 are given in Table 2. Test results are presented in Table 5. The relative amounts of polyester resin to TGIC varied from one example to another to keep the ratio of acid functionality to epoxy functionality constant as the acid number of the reactive matting agents differed.

Comparative Example 2 and 3 lacked any reactive matting agent. High gloss was achieved at curing temperatures of 300 and 400° F. for Comparative Example 2. Comparative Example 3 contained 40 parts by weight MINEX®, a common filler used to lower gloss, and as a result the 60° gloss was in the 50–75 unit range rather than in the 80–90 unit range.

Comparative Examples 4 and 5 illustrate the use of a zinc complex and ethylene acrylic acid copolymer as a matting agent for polyester systems as described in U.S. Pat. No. 5,684,067, EP 165,207 B1, EP 366,608 B1, Loar et al., and Chetcuti et al. Test results are presented in Tables 5–7. Results show that a matte finish could be achieved if cure was carried out at temperatures of 400° F. However, if cure was carried out at temperatures of 300° F. or below, the gloss value increased to 29–37 units. In addition, if cure was carried out at temperatures of less than 300° F. an undesirable surface haze was observed.

Comparative Examples 6–8 illustrate the use of styrene maleic anhydride copolymers or esterified styrene maleic anhydride copolymers as reactive matting agents in a polyester system cured with TGIC. Results for Comparative Example 6 and 8 in Table 5 show that SMA® 3840 and SMA® X.10840 were not effective in lowering the gloss in polyester systems curing with TGIC. Comparative Example 7 gave a coating in which the 60° gloss measured 19 units, but this coating was very textured which resulted in the low gloss value due to scattering of light within the texture grains.

The coatings of Examples 5 and 6 also used esterified styrene maleic anhydride copolymers as reactive matting agents. Results for Example 5 in Table 5 show that a consistent 60° gloss of 26 and 28 units was achieved when cure was carried out at temperatures of 400 and 300° F. respectively. Similarly, in Example 6 a consistent 60° gloss of 21 and 24 units was achieved when cure was carried out at temperatures of 400 and 300° F. respectively. However, when cure was carried out at temperatures of 275° a surface texture was formed resulting in lower gloss values (teens) for both Examples 5 and 6.

The coatings in Examples 1–4 use SMA® 1440F, an esterified styrene maleic anhydride copolymer, as the reactive matting agent in a polyester system cured with TGIC. Each of these examples demonstrated the ability to provide a smooth matte polyester finish at cure temperatures of 300° F. or less. They also provided a more consistent surface appearance when curing temperatures varied from 275 to 400° F. as compared to Comparative Examples 4 and 5 which used a zinc complex and. For instance, Example 2 provided a surface 60° gloss ranging from 10–17 units as cure temperatures varied from 275 to 400° F. Over a temperature range of 300 to 400° F., Examples 1, 2, and 4 provided 60° gloss ranging from 9–13, 15–17, and 12–17, respectively.

The coatings in Examples 7 and 8 used an acrylic acid copolymer as the reactive matting agent in a polyester system cured with TGIC. Example 8 demonstrated the ability to provide a smooth matte polyester finish at cure temperatures of 300° F. or less. For instance, 60° surface gloss varied from 14–20 units when curing temperatures varied from 275 to 400° F. Results for Example 8 in Table 5 show that 60° surface gloss varied from 28–33 units when curing temperatures varied from 275 to 400° F. Both examples 7 and 8 provided a more consistent surface appearance when curing temperatures varied from 275 to 400° F.

presented in Table 5. The relative amounts of polyester resin to beta-hydroxyalkylamide varied to keep the ratio of acid functionality to hydroxyl functionality constant as the acid number of the reactive matting agents differed.

Comparative Examples 10 and 11 show a polyester system cured with a beta-hydroxyalkylamide that lacked any reactive matting agent. Examples 10 and 11 contained 40

TABLE 2

Reactive matting agents in polyester/TGIC systems

| Component | C. Ex 2 | C. Ex 3 | C. Ex 4 | C. Ex 5 | Ex. 1 | Ex. 2 | Ex. 3 | Ex. 4 | C. Ex 6 | C. Ex 7 | C. Ex 8 | Ex. 5 | Ex. 6 | Ex. 7 | Ex. 8 |
|---|---|---|---|---|---|---|---|---|---|---|---|---|---|---|---|
| Rucote ® 911 | 93 | 93 | 93 | 93 | 58.9 | 58.9 | 68.9 | 58.9 | 71.6 | 71.5 | 67.25 | 64.6 | 68.0 | 55.8 | 55.8 |
| Araldite ® PT 810 | 7 | 7 | 7 | 7 | 13.1 | 13.1 | 11.1 | 13.1 | 8.4 | 8.5 | 12.75 | 15.4 | 12.0 | 12.2 | 12.2 |
| Resiflow ® P-67 | 1.5 | 1.5 | 1.5 | 1.5 | 1.5 | 1.5 | 1.5 | 1.5 | 1.5 | 1.5 | 1.5 | 1.5 | 1.5 | 1.4 | 1.4 |
| Benzoin M | 0.8 | 0.8 | 0.8 | 0.8 | 0.8 | 0.8 | 0.8 | 0.8 | 0.8 | 0.8 | 0.8 | 0.8 | 0.8 | 0.8 | 0.8 |
| Minex 7 | 10 | 40 | 10 | 40 | 10 | 40 | 40 | — | 40 | 40 | 40 | 40 | 40 | — | — |
| Barite 1075 | — | — | — | — | — | — | — | — | — | — | — | — | — | — | 20 |
| Raven 5000 Ultra II | — | 2 | — | 2 | — | 2 | 2 | 2 | 2 | 2 | 2 | 2 | 2 | — | — |
| Raven 1250 Beads | — | — | — | — | — | — | — | — | — | — | — | — | — | — | 2 |
| Tioxide TR 93 | 50 | — | 50 | — | 50 | — | — | — | — | — | — | — | — | 60 | — |
| DT 3329 | — | — | 9 | 9 | — | — | — | — | — | — | — | — | — | — | — |
| MB Envelon ® | — | — | 9 | 9 | — | — | — | — | — | — | — | — | — | — | — |
| SMA ® 1440F | — | — | — | — | 28 | 28 | 20 | 28 | — | — | — | — | — | — | — |
| SMA ® 3840 | — | — | — | — | — | — | — | — | 20 | — | — | — | — | — | — |
| SMA ® 31890 | — | — | — | — | — | — | — | — | — | 20 | — | — | — | — | — |
| SMA ® X.10840 | — | — | — | — | — | — | — | — | — | — | 20 | — | — | — | — |
| SMA ® X.11825 | — | — | — | — | — | — | — | — | — | — | — | 20 | — | — | — |
| SMA ® X.11850 | — | — | — | — | — | — | — | — | — | — | — | — | 20 | — | — |
| G-151 | — | — | — | — | — | — | — | — | — | — | — | — | — | 32 | 32 |
| Cab-O-Sil M5 | 0.2 | 0.2 | 0.2 | 0.2 | 0.2 | 0.2 | 0.2 | 0.2 | 0.2 | 0.2 | 0.2 | 0.2 | 0.2 | 0.1 | 0.1 |

EXAMPLE 9, COMPARATIVE EXAMPLE 9

The compositions of Example 9 and Comparative Example 9 are given in Table 3. Test results are presented in Table 5.

TABLE 3

Reactive matting agents in polyester/TGIC systems

| Component | Ex. 9 | C. Ex. 9 |
|---|---|---|
| Morkote ® 500P | 55.8 | 93 |
| Araldite ® PT 810 | 12.2 | 7 |
| MB 71000 | 0.6 | 0.6 |
| Resiflow ® P-67 | 1.4 | 1.4 |
| Benzoin M | 0.8 | 0.8 |
| Barite 1075 | 20 | 20 |
| Raven 1250 Beads | 2 | 2 |
| G-151 | 32 | — |
| Cab-O-Sil ® M5 | 0.1 | 0.1 |

Comparative Example 9 shows a catalyzed polyester system cured with TGIC that lacked any reactive matting agent. High gloss was achieved at 275, 300 and 400° F. The catalyzed polyester in Example 9 used an acrylic acid copolymer as the reactive matting agent and demonstrated the ability to provide a smooth matte polyester finish at cure temperatures of 300° F. Example 9 provided a surface 60° gloss ranging from 17–19 units as cure temperatures varied from 300–400° F. The catalyzed polyester system provided faster cure at comparable temperatures when compared to an uncatalyzed system such as is shown in Examples 7 and 8.

EXAMPLES 10–13, COMPARATIVE EXAMPLES 10–12

The compositions of Examples 10–13 and Comparative Examples 10–12 are given in Table 4. Test results are parts by weight MINEX®, a common filler used to lower gloss, and as a result the 60° gloss was in the 50–80 unit range at cure temperatures of 300 and 400° F.

The polyester system cured with beta-hydroxyalkylamide in Examples 10 and 11 used an esterified styrene maleic anhydride resin as a reactive matting agent. Example 10 demonstrates the ability to provide a consistent matte polyester finish over cure temperatures ranging from 275 to 400° F. Here, 60° gloss ranged from 9–12 units as cure temperature ranged from 275 to 400° F. Example 11 demonstrates the ability to provide a consistent low gloss polyester finish over varying cure temperatures; for example, gloss ranged from 27–32 as cure temperatures ranged from 275 to 400° F.

Comparative Example 12 shows that the absence of extender can affect the final surface gloss. For instance, in Comparative Example 12 gloss varied from 60–64 units as compared to 9–12 units for the similar Example 10. Extender levels can be used in systems as shown in Example 10 to control the gloss from 9 units to 60 units.

Examples 12 and 13 show a polyester system cured with beta-hydroxyalkylamide using acrylic acid copolymer as the reactive matting agent. Results in shown in Table 5 show that the coating systems in both Examples 12 and 13 provided a consistent low gloss polyester finish over varying cure temperatures. Gloss ranged from 27–30 units and 22–30 units as cure temperatures ranged from 300 to 400° F.

TABLE 4

| Component | C. Ex. 10 | C. Ex. 11 | Ex. 10 | Ex. 11 | C. Ex. 12 | Ex. 12 | Ex. 13 |
|---|---|---|---|---|---|---|---|
| Rucote ® 911 | 94.5 | 94.5 | 59.8 | 59.8 | 59.8 | — | — |
| Morkote ® 500P | — | — | — | — | — | 57.1 | 57.1 |

TABLE 4-continued

| Component | C. Ex. 10 | C. Ex. 11 | Ex. 10 | Ex. 11 | C. Ex. 12 | Ex. 12 | Ex. 13 |
|---|---|---|---|---|---|---|---|
| MB 71000 | — | — | — | — | — | 0.6 | 0.6 |
| Primid ® XL 552 | 5.5 | — | 12.2 | — | 12.2 | 10.9 | — |
| Primid ® QM 1260 | — | 5.5 | — | 12.2 | — | — | 10.9 |
| Resiflow ® P-67 | 1.5 | 1.5 | 1.5 | 1.5 | 1.5 | 1.5 | 1.5 |
| Benzoin M | 0.8 | 0.8 | 0.8 | 0.8 | 0.8 | 0.8 | 0.8 |
| Minex ® 7 | 40 | 40 | 40 | 40 | — | — | — |
| Barite 1075 | — | — | — | — | — | 20 | 20 |
| Raven 5000 Ultra II | 2 | 2 | 2 | 2 | 2 | 2 | 2 |
| SMA ® 1440F | — | — | 28 | 28 | 28 | — | — |
| G-151 | — | — | — | — | — | 32 | 32 |
| Cab-O-Sil ® M5 | 0.2 | 0.2 | 0.2 | 0.2 | 0.2 | 0.2 | 0.2 |

TABLE 5

| | Cure Temperature (° F.) | Cure Time (minutes) | 60° gloss units | Forward Impact (in.-lbs.) | MEK resistance (1–5 rating) |
|---|---|---|---|---|---|
| Comparative Ex. 1 | 400 | 10 | 4 | 40 | 3 |
| | 350 | 12 | 5 | 40 | 3 |
| | 300 | 30 | 6 | 40 | 2 |
| | 275 | 60 | 6 | 40 | 2 |
| Comparative Ex 2 | 400 | 15 | 80 | 120 | 4 |
| | 300 | 30 | 92 | 100 | 3 |
| Comparative Ex 3 | 400 | 15 | 53 | 160 | 4 |
| | 300 | 30 | 74 | 80 | 3 |
| Comparative Ex. 4 | 400 | 15 | 11 | 160 | 4 |
| | 300 | 30 | 37 | 160 | 1 |
| Comparative Ex. 5 | 400 | 15 | 9 | 160 | 4 |
| | 300 | 30 | 29 | 160 | 2 |
| | 275 | 45 | 31 | 160 | 2 |
| | 275 | 60 | 30 | 160 | 2 |
| Example 1 | 400 | 15 | 9 | 160 | 5 |
| | 300 | 30 | 13 | 80 | 4 |
| Example 2 | 400 | 15 | 10 | 160 | 5 |
| | 300 | 30 | 11 | 60 | 4 |
| | 275 | 60 | 17 | 80 | 3 |
| | 250 | 90 | 20 | 40 | 3 |
| Example 3 | 400 | 15 | 15 | 160 | 4 |
| | 300 | 30 | 17 | 100 | 3 |
| Example 4 | 400 | 15 | 12 | 160 | 4 |
| | 300 | 30 | 17 | 80 | 3 |
| Comparative Ex 6 | 400 | 15 | 56 | 160 | 5 |
| | 300 | 30 | 75 | 60 | 3 |
| Comparative Ex 7 | 400 | 15 | 19 (texture) | 160 | 4 |
| | 300 | 30 | 19 (texture) | 100 | 3 |
| Comparative Ex 8 | 400 | 15 | 47 | 80 | 5 |
| | 300 | 30 | 62 | 40 | 4 |
| Example 5 | 400 | 15 | 26 | 60 | 4 |
| | 300 | 30 | 28 | 40 | 3 |
| | 275 | 45 | 17 (texture) | 60 | 3 |
| Example 6 | 400 | 15 | 21 | 60 | 4 |
| | 300 | 30 | 24 | 40 | 3 |
| | 275 | 60 | 11 (texture) | 80 | 3 |
| Example 7 | 400 | 15 | 28 | 120 | 4 |
| | 300 | 30 | 33 | 60 | 3 |
| | 275 | 60 | 33 | 40 | 2 |
| Example 8 | 400 | 15 | 14 | 100 | 4 |
| | 300 | 30 | 16 | 60 | 3 |
| | 275 | 60 | 20 | 80 | 2 |
| Example 9 | 400 | 10 | 17 | 80 | 4 |
| | 300 | 15 | 19 | 60 | 3 |
| | 300 | 30 | 19 | 80 | 4 |
| Comparative Ex 9 | 325 | 5 | 85+ | 160 | 4 |
| | 300 | 10 | 85+ | 160 | 4 |
| | 275 | 15 | 85+ | 160 | 4 |
| Comparative Ex 10 | 400 | 15 | 50 | 160 | 3 |
| | 300 | 30 | 63 | 40 | 3 |
| Comparative Ex 11 | 400 | 15 | 67 | 160 | 3 |
| | 300 | 30 | 76 | 120 | 3 |
| Example 10 | 400 | 15 | 9 | 160 | 4 |
| | 300 | 30 | 11 | 80 | 3 |
| | 275 | 45 | 12 | 100 | 2 |
| | 275 | 60 | 11 | 100 | 3 |

TABLE 5-continued

|  | Cure Temperature (° F.) | Cure Time (minutes) | 60° gloss units | Forward Impact (in.-lbs.) | MEK resistance (1–5 rating) |
|---|---|---|---|---|---|
| Example 11 | 400 | 15 | 27 | 100 | 4 |
|  | 300 | 30 | 30 | 120 | 4 |
|  | 275 | 45 | 30 | 80 | 3 |
|  | 275 | 60 | 32 | 100 | 3 |
| Comparative Ex 12 | 400 | 15 | 60 | 160 | 4 |
|  | 300 | 30 | 64 | 40 | 1 |
| Example 12 | 400 | 15 | 27 | 40 | 3 |
|  | 300 | 30 | 30 | 40 | 2 |
| Example 13 | 400 | 15 | 22 | 40 | 4 |
|  | 300 | 30 | 30 | 20 | 3 |

The reactive matting agents described in the present inventions not only offer consistent matte and low gloss polyester finishes using TGIC or beta-hydroxyalkylamide curing agents over a wide range of curing temperatures, they also provide improved color stability over other techniques to yield low gloss polyesters.

Table 6 compares the color stability of examples that used a zinc complex and ethylene acrylic acid copolymer matting agent as described in U.S. Pat. No. 5,684,067 to examples that used styrene maleic anhydride copolymers as the reactive matting agent. All samples were compared in an acid functional polyester system cured with TGIC. Compositions are shown in Table 2. Comparative Example 2 lacked any matting agent and showed a color difference of 1.17 Delta E units when cured at 400 verses 300° F. Over the same temperature range, Comparative Example 4 which contained a zinc complex and ethylene acrylic acid copolymer, showed a color difference of 4.62 units. In contrast, Examples 1 and 7, which used reactive matting agents, showed a color difference of 1.22 units and 1.44 units respectively. The results for Examples 1 and 7 were similar to results for Comparative Example 2 without matting agent.

TABLE 6

| CIE Lab/Delta E (400° F./15 minutes verses 300° F./30 minutes) | |
|---|---|
| Comparative Ex. 2 | 1.17 units |
| Comparative Ex. 4 | 4.62 units |
| Example 1 | 1.22 units |
| Example 7 | 1.44 units |

Table 7 compares the UV stability of examples that used a zinc complex and ethylene acrylic acid copolymer matting agent as described in U.S. Pat. No. 5,684,067 to examples that used styrene maleic anhydride copolymers as the reactive matting agent. All samples were acid functional polyesters cured with TGIC. Compositions are shown in Table 2. QUV testing was performed according to ASTM G-53 (4 hours UV@60° C./4 hours condensation/UVA@50° C.) with UVA lamps. Samples were removed from testing after 500 hours of exposure or when greater than 50% gloss loss was reached.

Comparison of the white examples (Comparative Examples 2 and 4 and Example 1) in the Table 7, shows that a control without matting agent, Comparative Example 2, gave a color difference of 0.71 and 0.22 Delta E units and a gloss change from 72 to 65 units and 89 to 70 units after 500 hours of QUV exposure. Comparative Example 4, which contained a zinc complex and ethylene acrylic acid copolymer, showed a color difference of 2.99 Delta E units and a gloss change from 12 to 8.8 units after 500 hours of QUV exposure. The sample cured at 300° F. was removed from testing after 240 hours when the gloss reduced by more than 50%. Example 1, which contained reactive matting agents as described in the present invention, showed a color difference of 0.85 and 1.69 Delta E units and a gloss change from 7.2 to 7.5 units and 11 to 13 units after 500 hours QUV exposure. Similarly, the black Example 2 that contained esterified styrene maleic anhydride resins as matting agents showed a gloss and color stability improvement over the black system, Comparative Example 5, that contained a zinc complex and ethylene acrylic acid copolymer matting agent.

TABLE 7

|  | Cure Temp (° F.) | Cure Time (minutes) | initial 60° gloss units | final 60° gloss after QUV | QUV exposure hours | Delta E/CIE after QUV |
|---|---|---|---|---|---|---|
| Comparative Ex. 2 | 400 | 15 | 72 | 65 | 500 | 0.71 |
|  | 300 | 30 | 89 | 70 | 500 | 0.22 |
| Comparative Ex. 3 | 400 | 15 | 50 | 19 | 408 | 4.91 |
|  | 300 | 30 | 68 | 30 | 240 | 3.68 |
| Comparative Ex. 4 | 400 | 15 | 12 | 8.8 | 500 | 2.99 |
|  | 300 | 30 | 35 | 14 | 240 | 0.35 |
| Comparative Ex. 5 | 400 | 15 | 9 | 4 | 240 | 3.58 |
|  | 300 | 30 | 27 | 6 | 168 | 3.16 |
| Example 1 | 400 | 15 | 7.2 | 7.5 | 500 | 0.85 |
|  | 300 | 30 | 11 | 13 | 500 | 1.69 |
| Example 2 | 400 | 15 | 10 | 10 | 500 | 0.31 |
|  | 300 | 30 | 11 | 11 | 500 | 0.24 |

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

We claim:

1. A curable powder coating composition, comprising:
   an acid-functional polyester thermoset resin; and
   a matting agent selected from styrene-maleic anhydride copolymers having a glass transition temperature (Tg) of at least 45° C. and up to 110° C. and, further, having an acid number of at least 110 mg KOH/g and up to 210 mg KOH/g.

2. The curable powder coating composition of claim 1, wherein the acid-functional polyester resin is the polymerization product of a polyol and a polycarboxylic acid; wherein the polyol is selected from the group consisting of 1,2-ethanediol, 1,3-propanediol, 1,4-butanediol, diethylene glycol, 1,6-hexanediol, neopentyl glycol, 1,10-decanediol, 1,4-cyclohexanedimethanol, trimethylolpropane, 2-methyl-1,3-propanediol, 2,2-(dlcyclohexanol)propane, 2,2,4-trimethyl-1,3-pentanediol, 3-hydroxy-2,2-dimethylpropyl 3-hydroxy-2,2-dimethylpropanoate, 1,12-dodecanediol, 2-methyl-2-hydroxymethyl-1,3-propanediol, 2-ethyl-2-hydroxymethyl-1,3-propanediol, and combinations comprising at least one of the foregoing polyols; and wherein the polycarboxylic acid is selected from the group consisting of succinic acid, adipic acid, azelaic acid, sebacic acid, 1,12-dodecanedioic acid, terephthalic acid, isophthalic acid, trimesic acid, tetrahydrophthalic acid, hexahydrophthalic acid, 1,4-cyclohexanedicarboxylic acid, trimellitic acid, naphthalene dicarboxylic acid, and combinations comprising at least one of the foregoing polycarboxylic acids.

3. The curable powder coating composition of claim 1, wherein the matting agent comprises a partially monoesterified styrene-maleic anhydride resin.

4. The curable powder coating composition of claim 1, wherein the matting agent is a styrene-maleic anhydride copolymer having a mole ratio of styrene:maleic anhydride of 1:1 to 4:1.

5. The curable powder coating composition of claim 1, comprising 3 to 35 weight percent of the matting agent, based on the total weight of the composition.

6. The curable powder coating composition of claim 1, further comprising an epoxy thermoset resin.

7. The curable powder coating composition of claim 6, wherein the epoxy thermoset resin is a bisphenol A epoxy resin.

8. The curable powder coating composition of claim 1, further comprising a curing agent.

9. The curable powder coating composition of claim 8, wherein the curing agent is selected from the group consisting of heterocyclic polyepoxides, polyepoxides of aromatic polyols, glycidyl esters of aromatic or aliphatic polyacids, polyepoxides of amino-alcohols, amide compounds having two or more hydroxyl groups, imidazoles, adducts of imidazoles and epoxy resins, trihydrocarbyl phosphines, tetrahydrocarbyl phosphonium halides, and combinations comprising at least one of the foregoing curing agents.

10. The curable powder coating composition of claim 9, comprising 0.1 to 20 parts by weight of the curing agent per 100 parts by weight of the acid-functional polyester resin.

11. The curable powder coating composition of claim 1, further comprising an additive selected from the group consisting of flow control agents, dry flow agents, antioxidants, pigments, optical brighteners, extenders, and combinations comprising at least one of the foregoing additives.

12. The curable powder coating composition of claim 1, wherein the composition after curing exhibits 60° gloss value less than 30 units measured according to ASTM D523.

13. The curable powder coating composition of claim 1, wherein the composition is curable at a temperature less than 300° F. to form a surface having a 60° gloss value less than 30 units measured according to ASTM D523.

14. The curable powder coating composition of claim 1, wherein curing the composition at any temperature in the range of 300° F. to 400° F. produces a 60° gloss value less than 30 units measured according to ASTM D523.

15. A curable powder coating composition 1, comprising:
   100 parts by weight of an acid-functional polyester thermosetting resin;
   5 to 35 weight percent of a partially monoesterified styrene-maleic anhydride resin having a glass transition temperature (Tg) of at least 45° C. and less than 90° C. and having an acid number of at least 110 mg KOH/g and up to 210 mg KOH/g, based on the total weight of the composition; and
   1 to 20 parts by weight of a curing agent selected from heterocyclic polyepoxides, polyepoxides of aromatic polyols, beta-hydroxyalkyl amides, and mixtures thereof.

16. A curable powder coating composition, comprising:
   10 to 90 parts by weight of an acid-functional polyester thermosetting resin;
   90 to 10 parts by weight of an epoxy thermosetting resin, wherein the sum of the polyester thermosetting resin and the epoxy thermosetting resin is 100 parts by weight;
   5 to 35 weight percent of a partially monoesterified styrene-maleic anhydride resin having a glass transition temperature (Tg) of at least 45° C. and less than 90° C. and having an acid number of at least 110 mg KOH/g and up to 210 mg KOH/g, based on the total weight of the composition; and
   1 to 20 parts by weight of a curing agent selected from heterocyclic polyepoxides, polyepoxides of aromatic polyols, beta-hydroxyalkyl amides, and mixtures thereof.

17. A cured powder coating composition, comprising the reaction product of:
   an acid-functional polyester thermoset resin; and
   a matting agent selected from styrene-maleic anhydride copolymers having a glass transition temperature (Tg) of at least 45° C. and up to 110° C. and, further, having an acid number of at least 110 mg KOH/g and up to 210 mg KOH/g.

18. An article comprising the cured powder coating composition of claim 17.

19. A method of forming a cured powder coating, comprising:
   heating a curable powder coating composition at a temperature up to 350° F. and a time up to 60 minutes to form a cured powder coating exhibiting a 60° gloss value less than 30 units measured according to ASTM D523;

wherein the curable powder composition comprises an acid-functional polyester thermoset resin, and a matting agent selected from styrene-maleic anhydride copolymers having a glass transition temperature (Tg) of at least 45° C. and up to 110° C. and, further, having an acid number of at least 110 mg KOH/g and up to 210 mg KOH/g.

20. A method of forming a cured powder coating, comprising:

heating a curable powder coating composition at a temperature of 250° F. to 400° F. and a time of 1 minute to 60 minutes to form a cured powder coating exhibiting a 60° gloss value less than 30 units measured according to ASTM D523;

wherein the curable powder composition comprises an acid-functional polyester thermoset resin, and a matting agent selected from styrene-maleic anhydride copolymers having a glass transition temperature (Tg) of at least 45° C. and up to 110° C. and, further, having an acid number of at least 110 mg KOH/g and up to 210 mg KOH/g; and wherein the specified gloss is obtained throughout the curing temperature range of 250° F. to 400° F.

* * * * *